(12) United States Patent
Sutton

(10) Patent No.: US 10,562,212 B2
(45) Date of Patent: Feb. 18, 2020

(54) PROCESS AND APPARATUS TO INJECTION MOLD CONTINUOUS LENGTHS OF HOLLOW PLASTIC ARTICLES

(71) Applicant: Gerald Sutton, Boonville, IN (US)

(72) Inventor: Gerald Sutton, Boonville, IN (US)

( * ) Notice: Subject to any disclaimer, the term of this patent is extended or adjusted under 35 U.S.C. 154(b) by 455 days.

(21) Appl. No.: 15/398,248

(22) Filed: Jan. 4, 2017

(65) Prior Publication Data

US 2018/0186045 A1    Jul. 5, 2018

(51) Int. Cl.
*B29C 45/00* (2006.01)
*B29C 45/26* (2006.01)
*B29K 101/12* (2006.01)
*B29L 23/18* (2006.01)

(52) U.S. Cl.
CPC ...... *B29C 45/0003* (2013.01); *B29C 45/2612* (2013.01); *B29K 2101/12* (2013.01); *B29L 2023/186* (2013.01)

(58) Field of Classification Search
CPC ............ B29C 45/0003; B29C 45/2612; B29L 2023/186; B29K 2101/12
See application file for complete search history.

(56) References Cited

U.S. PATENT DOCUMENTS

| | | | |
|---|---|---|---|
| 2,969,563 A | 1/1961 | Hendry | |
| 3,313,873 A | 4/1967 | Dembiak | |
| 3,478,139 A | 11/1969 | Martin et al. | |
| 3,959,427 A | 5/1976 | Van Zon | |
| 3,992,503 A | 11/1976 | Henfrey et al. | |
| 4,096,887 A | 6/1978 | Streit | |
| 4,321,227 A | 3/1982 | Henfrey et al. | |
| 4,832,307 A | 5/1989 | Watanabe et al. | |
| 4,983,347 A | 1/1991 | Rahn | |
| 5,011,642 A | 4/1991 | Vvelygan et al. | |
| 5,139,730 A | 8/1992 | Holso et al. | |
| 6,379,600 B1 | 4/2002 | Sanders | |
| 6,790,399 B2 | 9/2004 | Fujii | |
| 7,293,341 B2 | 11/2007 | Zydron | |
| 7,910,036 B2 | 3/2011 | Privan | |

FOREIGN PATENT DOCUMENTS

DE    2615420 C2    3/1986

*Primary Examiner* — Robert J Grun
(74) *Attorney, Agent, or Firm* — Martin IP Law Group; C. Richard Martin

(57) ABSTRACT

A method and apparatus for manufacturing continuous ribbed pipes of thermoplastic resin material comprises the following successive steps. A length of pipe is injection molded in a mold cavity between a collapsible male mold element and female mold elements, the latter being shaped to provide integral ribbing on the outer surface of the pipe. After sufficient setting, the female mold elements are disengaged and the male mold element is collapsed and disengaged. A plunger then pushes the pipe length axially along the male mold element. The female mold elements and the collapsed male mold element are then re-engaged such that the one end of the formed pipe forms a closure for the mold cavity at the downstream end. Further material is again injected into the cavity which fuses with the one pipe end and which forms a further pipe length. These steps are repeated until the desired length of pipe is formed.

21 Claims, 2 Drawing Sheets

PROCESS AND APPARATUS TO INJECTION MOLD CONTINUOUS LENGTHS OF HOLLOW PLASTIC ARTICLES

BACKGROUND OF THE INVENTION

Field of the Invention

The present invention relates to plastic articles such as large diameter plastic pipes used in underground applications. More specifically, the present invention relates to a process and machine for injection molding such pipes.

Description of the Related Art

Plastic pipes for use in underground sewerage and drainage applications are usually manufactured by means of an extrusion process. The wall thickness of these pipes is considerable, in view of the crushing strength required of the pipes. To reduce costs, pipes of lesser wall thickness that are corrugated or ribbed are commonly used for such applications.

Prior art extrusion processes required several separate molds to form a large diameter ribbed length of pipe. Many of these machines have ten or more mold sets. These molds are shuttled from one end of the forming machine to the other in a substantially continuous fashion. The mechanisms used to shuttle the molds and cool these moving molds are often very complicated and very expensive. In addition, the molds themselves are very expensive.

An injection molding process has also been proposed for manufacturing such pipes. U.S. Pat. No. 3,992,503 (the '503 Patent) proposed a method of manufacturing continuous ribbed pipes of thermoplastic resin material without the need to shuttle and cool numerous molds. According to the method proposed by the '503 Patent, a length of pipe is injection molded in a mold cavity between male and female molds, the latter being shaped to provide integral ribbing on the outer surface of the pipe. After sufficient setting, the female mold is disengaged and the pipe length is ejected along the male mold by a plunger, whereupon the female mold is re-engaged with the one end of the formed pipe forming a closure for the mold cavity. Further material is again injected into the cavity which fuses with said one pipe end and which forms a further pipe length. These steps are repeated until the desired length of pipe is formed. It is almost impossible to separate the formed pipe from the male mold by simply pushing the formed pipe with the plunger. Accordingly, heat is applied to melt the inner surface of the pipe next to the male mold so that it can be released and ejected. This is a very ineffective and impractical method.

Accordingly, there is a need for a method and apparatus to injection mold continuous lengths of plastic pipe where the male mold member is separated from the formed pipe prior to the step of ejecting the newly formed pipe from the area of the female mold elements. Alternatively, there is a need for a method and apparatus to injection mold continuous lengths of plastic pipe where the male mold member is used to eject the newly formed pipe from the area of the female mold element and the male mold member is then subsequently separated from the newly formed pipe and returned to its original position.

SUMMARY OF THE INVENTION

It is therefore an object of the present invention to provide a method and apparatus for manufacturing pipes of the type specified where the male mold member is retracted from engagement with the newly formed pipe at some point in the manufacturing process.

The present invention meets this object by providing a method and apparatus to injection mold continuous lengths of pipe where the male mold member is separated from the formed pipe prior to the step of ejecting the newly formed pipe from the area of the female mold elements.

The present invention also meets this object by providing a method and apparatus to injection mold continuous lengths of pipe where the male mold member is used to eject the newly formed pipe from the area of the female mold element and the male mold member is then subsequently separated from the newly formed pipe and returned to its original position.

It is to be appreciated that the present invention allows pipes to be manufactured relatively inexpensively. This is due to a number of reasons: Firstly, ribbed pipes made in this manner will provide much greater control of rib thickness and shape when compared to hollow ribbed pipe produced by way of continuous extrusion methods. This type of pipe is commonly referred to as corrugated pipe and there are numerous manufacturers of this pipe though out the world. Corrugated pipe has hollow ribs and the rib thickness varies greatly. These hollow ribs are always much thicker at the bottom than the top. There is typically a factor of 5:1 or more when comparing wall thickness at the bottom of the rib to the top of the rib. There are numerous reasons for this and it is inherent to the technology. This invention greatly improves this ratio to nearly 1:1. A small draft angle for mold removal is all that is needed. As a result ribs made in this manner can have a much higher moment of inertia and therefore stiffness, than corrugated pipe ribs. This will allow pipe manufacturers to produce significantly lighter weight pipes with similar structural performance when compared to corrugated pipes of the same size.

Another advantage to this invention is lower machinery costs. With this system, only one set of female and male mold elements are required. Conventional corrugators require 8 to 30 molds depending on the size and corrugator manufacturer. It is estimated that a typical corrugator machine for producing 60" ID pipe will easily be 50% more expensive than a 60" machine that employs this invention.

According to one presently preferred embodiment of the invention, there is provided a method of making ribbed pipe in a stepwise manner, comprising the successive steps of: (a) forming a length of pipe by injection molding a moldable materials such as plastic resin in a cavity between a collapsible male mold element and a plurality of female mold elements; (b) disengaging said plurality of female mold elements from said length of pipe; (c) collapsing said collapsible male mold element to disengage from said length of pipe; (d) advancing and guiding a plunger positioned at a first end of the cavity in an axial direction toward a second end of the cavity to partially eject said length of pipe from the cavity; (e) retracting said plunger to its original position; (f) engaging said plurality of female mold elements to clamp an inner end of said length of pipe at a position near the second end of the cavity; (g) expanding said male mold element thereby closing the second end of said cavity opposite said plunger; (h) injecting further moldable material into said cavity to form a further length of pipe and homogeneously welding said further moldable material to the inner end of the partially ejected length of pipe; (i) repeating steps b-h to form pipe of a desired length.

According to an alternative preferred embodiment of the invention, there is provided a method of making ribbed pipe in a stepwise manner, comprising the successive steps of: (a) forming a length of pipe by injection molding a moldable material such as plastic resin in a cavity between a collapsible male mold element and a plurality of female mold elements; (b) disengaging said plurality of female mold elements from said length of pipe; (c) advancing the collapsible male mold element in an axial direction toward a second end of the cavity to partially eject said length of pipe from the cavity; (d) collapsing said collapsible male mold element to disengage from said length of pipe; (e) retracting the collapsible male mold element to its original position; (f) engaging said plurality of female mold elements to clamp an inner end of said length of pipe at a position near the second end of the cavity; (g) expanding said male mold element thereby closing the second end of said cavity; (h) injecting further moldable material into said cavity to form a further length of pipe and homogeneously welding said further moldable material to the inner end of the partially ejected length of pipe; (i) repeating steps b-h to form pipe of a desired length.

The plurality of female mold elements may include a plurality of radial spaced cavities to form integral ribs on an outer surface of said pipe. The radially spaced cavities may be shaped to provide said transverse ribbing at right angles to the pipe length and to provide longitudinal ribs along the pipe joining said transverse ribs and forming pockets there between. Alternatively, the female mold elements may be shaped to provide said ribbing inclined to the pipe axis and crossed. The plastic resin may be foamed and low pressure injection molding may by used.

According to a further aspect of the invention, there is provided an apparatus for making ribbed pipe in a stepwise manner comprising: a collapsible male mold element; a plurality of female mold elements removably positioned about the periphery of said collapsible male mold element forming a cavity therebetween; means for injecting a moldable material such as plastic resin material into the cavity between the collapsible male mold element and the plurality of female mold elements to form a length of pipe; and means for advancing and guiding said formed length of pipe toward a second end of said cavity.

The means for advancing and guiding according to one aspect of this embodiment may include a plunger positioned at a first end of the cavity and movable axially toward the second end of the cavity. Alternatively, the means for advancing and guiding may be the collapsible male mold element or the means for advancing and guiding could be the plurality of female mold elements The plurality of female mold elements may include a plurality of radial spaced cavities to form integral ribs on an outer surface of said pipe. The female mold elements may further be shaped to provide said transverse ribbing at right angles to the pipe length and to provide longitudinal ribs along the pipe joining said transverse ribs and forming pockets there between. The female mold elements may alternatively be shaped to provide said ribbing inclined to the pipe axis and crossed.

These and other objects, features and advantages of the present invention will become apparent from a review of the following drawings and detailed description of the preferred embodiments of the invention.

BRIEF DESCRIPTION OF THE DRAWINGS

The present invention can best be understood in connection with the accompanying drawings. It is noted that the invention is not limited to the precise embodiments shown in the drawings, in which.

DETAILED DESCRIPTION OF THE INVENTION

Figure 1:
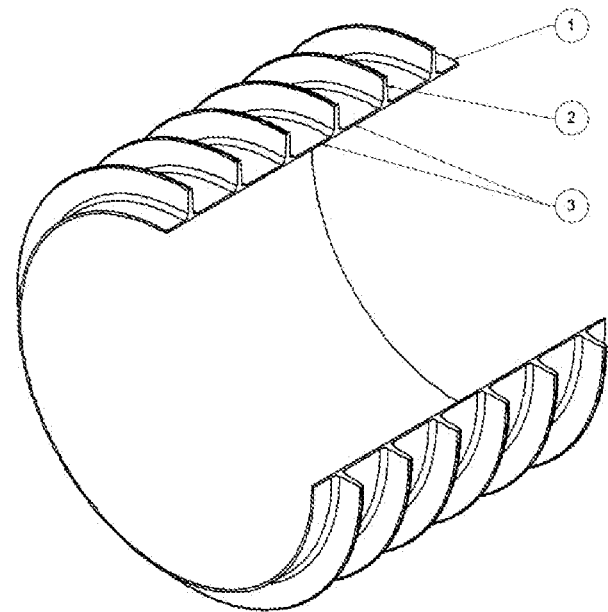
FIG. 1 is a perspective view of part of a cross sectioned length of pipe.

For purposes of promoting and understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

As best shown in FIG. 1, a pipe 1 of thermoplastic resin material is to be made with transverse ribs 2 forming pockets 3 with the ribs 2 by utilizing the method and apparatus of the present invention. The ribs 2 are to be formed integrally with the pipe 1 on its outer surface to enhance its rigidity.

Figure 2:
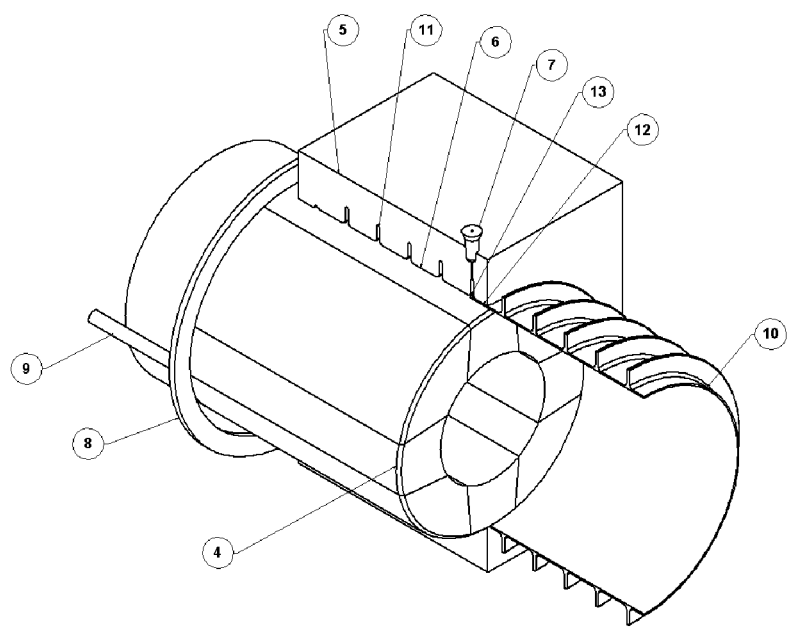
FIG. 2 is a perspective view of cross-sectioned pipe and molding apparatus assembly set in the molding position.

A pipe mold assembly according to a preferred embodiment of the invention to injection mold continuous lengths of hollow plastic articles such as pipe 10 is shown in FIG. 2. The pipe mold assembly shown in FIG. 2 comprises a collapsible male mold in the form of a cylindrical member 4 of substantially circular cross-section, and a female split mold in the form of two or more mold elements 5 enclosing the cylindrical member 4. In their operative position, the collapsible male mold element 4 and the female mold elements 5 define a mold cavity 6 therebetween.

Figure 3:
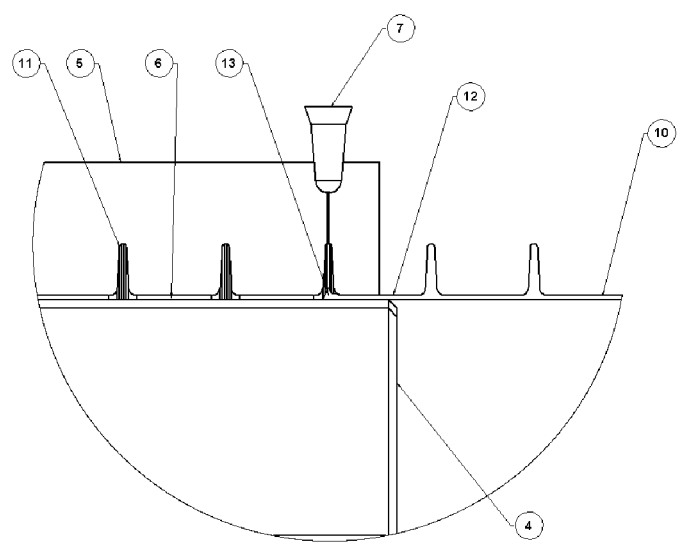
FIG. 3 is a detailed view of the cross-sectioned pipe and molding apparatus assembly set in the molding position.

As more clearly shown in FIG. 3, female mold members 5 are also provided with channels 11 for forming the ribs 2. Molten plastics material may be injected into this cavity by means of injecting apparatus 7 in the usual way. There may be any number of injecting apparatus used to fill the cavity and they may be positioned as needed. The female mold elements 5 are arranged to contact the collapsible cylindrical male mold element 4 at the upstream end of cavity 6 to create a seal when in their operative position. The cavity 6 is closed off at the downstream end by the previously formed section of pipe 10 when female mold elements 5 and male mold element 4 are in their operative position. Thus the cavity 6 is closed off at both the upstream and downstream ends of the mold assembly prior to injection of molten plastic.

A plunger 8 is mounted to the mounting frame (not shown) for the male mold element 4 by way of a mechanical linkage 9. This plunger 8 is hydraulically, pneumatically or otherwise powered and can actuate back and forth in the axial direction.

According to one preferred embodiment, the process to injection mold a continuous length of pipe includes injection of molten plastics material into the cavity 6 when the collapsible male mold element 4 and female mold elements 5 are in the operable position as shown in FIG. 2 and FIG. 3. When the plastics material has hardened sufficiently, the female mold elements 5 are lifted off the molded pipe and the male mold element 4 is collapsed inwardly off the pipe. The molded pipe is then no longer constrained by either the male or the female mold members and is free to be easily repositioned. The molded pipe is then pushed in the axial direction by means of the plunger 8 to a position in which the pipe inner end 12 is aligned with the end of the mold assembly. The plunger 8 is then returned to its starting position, the female elements 5 are returned to the operative position, and the male mold element 4 is expanded to its operative position. The inner end 12 of the molded pipe 10 now forms a closure to the mold cavity 6 on the downstream end of the mold assembly. Molten plastics material is once more injected into the cavity 6 and fuses with the inner end 12 of the molded pipe 10. The new length of pipe comprising two short lengths welded at the center of the length thereof is subsequently repositioned as described above. This cycle is repeated until the desired length of ribbed plastic pipe is obtained.

According to an alternative preferred embodiment, the process to injection mold a continuous length of pipe includes injection of molten plastics material into the cavity 6 when the collapsible male mold element 4 and female mold elements 5 are in the operable position as shown in FIG. 2 and FIG. 3. When the plastics material has hardened sufficiently, the female mold elements 5 are lifted off the molded pipe and the male mold element 4 with the molded pipe still affixed thereto is pushed in the axial direction to a position in which the pipe inner end 12 is aligned with the end of the mold assembly. The male mold element 4 is then collapsed inwardly off the pipe, and then returned to its starting position. The female elements 5 are returned to the operative position, and the male mold element 4 is expanded to its operative position. The inner end 12 of the molded pipe 10 now forms a closure to the mold cavity 6 on the downstream end of the mold assembly. Molten plastics material is once more injected into the cavity 6 and fuses with the inner end 12 of the molded pipe 10. The new length of pipe comprising two short lengths welded at the center of the length thereof is subsequently repositioned as described above. This cycle is repeated until the desired length of ribbed plastic pipe is obtained. According to yet a further embodiment, the process to injection mold a continuous length of pipe includes injection of molten plastics material into the cavity 6 when the collapsible male mold element 4 and female mold elements 5 are in the operable position as shown in FIG. 2 and FIG. 3. When the plastics material has hardened sufficiently, the male mold element 4 is collapsed inwardly off the pipe and the female mold elements 5 are pushed in the axial direction to a position in which the pipe inner end 12 is aligned with the end of the mold assembly. The female mold elements 5 may then lifted off the molded pipe and returned to their starting position. The female mold elements 5 are returned to the operative position, and the male mold element 4 is expanded to its operative position. The inner end 12 of the molded pipe 10 now forms a closure to the mold cavity 6 on the downstream end of the mold assembly. Molten plastics material is once more injected into the cavity 6 and fuses with the inner end 12 of the molded pipe 10. The new length of pipe comprising two short lengths welded at the center of the length thereof is subsequently repositioned as described above. This cycle is repeated until the desired length of ribbed plastic pipe is obtained.

It is to be noted that the inner end 12 of pipe 10 may be shaped to enhance jointing with a subsequent molded pipe length. In this embodiment of the invention it is molded with a stepped diameter as at 13, but any suitable formation may be employed, to facilitate the homogeneous fusion between the end of the pipe previously formed and the plastics material injected to form the next pipe length.

Figure 4:
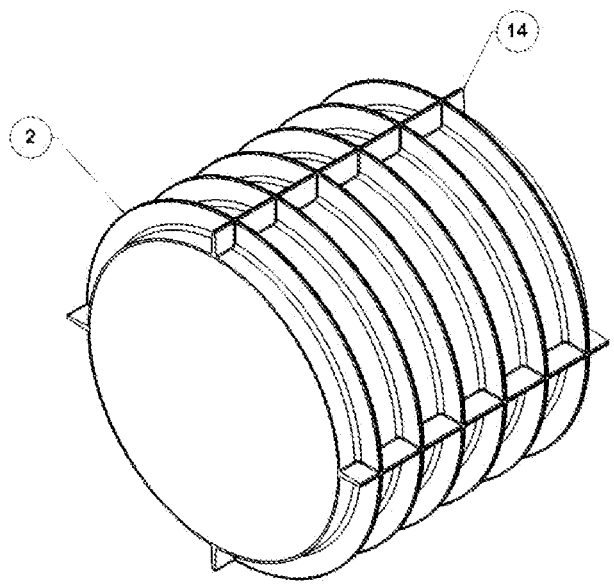
FIG. 4 is an illustration of an alternative rib design of the pipe.

FIG. 4 shows another pipe formed by the process and apparatus of the present invention which incorporates longitudinal ribs 14 in addition to the transverse ribs 2. Longitudinal ribs will greatly enhance the overall strength of the pipe and reduce deflection especially in the case of axial loads. Any number of longitudinal ribs may be added and not just four as shown here. The transverse ribs 2 may also be different and in particular the ribs may be continuous and spiral down the pipe axis in a helical manner. The precise shape of the rib may be formed differently to increase stiffness, reduce material usage, improve processing or reduce costs.

According to another aspect of the invention, the plastics material used may be foamed inside the mold cavity 6. In this case, as the plastics material is injected into the mold cavity 6, it expands to form a foamed structure. The foaming of the material is effected by conventional methods and the resulting pipe has a smooth outer and inner skin. Preferably the foaming is effected to produce a closed cell foamed structure. The thickness of the inner and outer skins can be controlled in known manner. Any suitable plastics material may be used. Suitable in this class are low density polyethylene, high density polyethylene, polypropylene, polystyrene, polyvinyl chloride or any suitable copolymer or alloy of these resins.

With regard to the embodiment described above, an even further saving of plastics material is obtained, because the density of the material can be reduced considerably in comparison with a pipe made of unfoamed material. Also, such pipes have a relatively low weight making the transportation and handling thereof easier. Another advantage of this aspect is that the molds used for molding foamed material do not have to withstand high pressures as is known. Thus, these molds may be made from relatively inexpensive material, for instance, cast aluminum. In all cases, the pipes produced are inherently easier to handle than pipes of other material such as concrete and steel and are not as brittle as concrete pipes.

The method of manufacture according to this invention may be varied without departing from the scope of the invention. In particular, the method is not limited to the use of the parts and arrangement of parts described above. For instance, where a pipe is to be made with more than four longitudinal ribs, more than two female mold members will be used. It is considered that a pipe may also be made with any material that can be injection molded, including aluminum, steel, thermoset resin, metal reinforcing or the like, molded therein.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

I claim:

1. A method of making ribbed pipe in a stepwise manner, comprising the successive steps of:
    (a) forming a length of pipe by injection molding a moldable material in a cavity between a collapsible mandrel and a plurality of female mold elements;
    (b) disengaging said plurality of female mold elements from said length of pipe;
    (c) collapsing said collapsible mandrel to disengage from said length of pipe;
    (d) advancing and guiding a plunger positioned at a first end of the cavity in an axial direction downstream to partially eject said length of pipe from the cavity;
    (e) retracting said plunger to its original position;

(f) engaging said plurality of female mold elements to clamp an inner end of said length of pipe at a position near the second end of the cavity;

(g) expanding said mandrel thereby closing the second end of said cavity opposite said plunger;

(h) injecting further moldable material into said cavity to form a further length of pipe and homogeneously welding said further moldable material to the inner end of the partially ejected length of pipe;

(i) repeating steps b-h to form pipe of a desired length.

2. The method as claimed in claim 1, wherein said plurality of female mold elements include a plurality of radial spaced cavities to form integral ribs on an outer surface of said pipe.

3. The method as claimed in claim 2, wherein the female mold elements are shaped to provide said transverse ribbing at right angles to the pipe length and to provide longitudinal ribs along the pipe joining said transverse ribs and forming pockets there between.

4. The method as claimed in claim 3, wherein the female mold elements are shaped to provide said ribbing inclined to the pipe axis and crossed.

5. The method as claimed in claim 1 wherein the moldable material is plastic resin.

6. The method as claimed in claim 5 in which said plastic resin material is foamed.

7. The method as claimed in claim 6 wherein low pressure injection molding is used.

8. A method of making ribbed pipe in a stepwise manner, comprising the successive steps of:

(a) forming a length of pipe by injection molding a moldable material in a cavity between a collapsible mandrel and a plurality of female mold elements;

(b) disengaging said plurality of female mold elements from said length of pipe;

(c) advancing the collapsible mandrel in an axial direction downstream to partially eject said length of pipe from the cavity;

(d) collapsing said collapsible mandrel to disengage from said length of pipe;

(e) retracting the collapsible mandrel to its original position;

(f) engaging said plurality of female mold elements to clamp an inner end of said length of pipe at a position near the second end of the cavity;

(g) expanding said mandrel thereby closing the second end of said cavity;

(h) injecting further moldable material into said cavity to form a further length of pipe and homogeneously welding said further moldable material to the inner end of the partially ejected length of pipe;

(i) repeating steps b-h to form pipe of a desired length.

9. The method as claimed in claim 8, wherein said plurality of female mold elements include a plurality of radial spaced cavities to form integral ribs on an outer surface of said pipe.

10. The method as claimed in claim 9, wherein the female mold elements are shaped to provide said transverse ribbing at right angles to the pipe length and to provide longitudinal ribs along the pipe joining said transverse ribs and forming pockets there between.

11. The method as claimed in claim 10, wherein the female mold elements are shaped to provide said ribbing inclined to the pipe axis and crossed.

12. The method as claimed in claim 8, wherein the moldable material is plastic resin.

13. The method as claimed in claim 12, wherein said plastic resin material is foamed.

14. The method as claimed in claim 13, wherein low pressure injection molding is used.

15. An apparatus for continuous injection molding ribbed pipe in a stepwise manner, comprising:
   a collapsible mandrel;
   a plurality of female mold elements removably positioned about the periphery of said collapsible mandrel forming a cavity therebetween;
   means for injecting moldable material into the cavity between the collapsible mandrel and the plurality of female mold elements to form a length of pipe;
   means for advancing and guiding said formed length of pipe downstream.

16. The apparatus for continuous injection molding ribbed pipe according to claim 15 wherein the means for advancing and guiding comprises a plunger positioned at a first end of the cavity and movable axially toward the second end of the cavity.

17. The apparatus for continuous injection molding ribbed pipe according to claim 15 wherein the means for advancing and guiding is the collapsible mandrel.

18. The apparatus for continuous injection molding ribbed pipe according to claim 15 wherein the means for advancing and guiding is the plurality of female mold elements.

19. The apparatus for continuous injection molding ribbed pipe according to claim 15, wherein said plurality of female mold elements include a plurality of radial spaced cavities to form integral ribs on an outer surface of said pipe.

20. The apparatus for continuous injection molding ribbed pipe according to claim 19, wherein the female mold elements are shaped to provide said transverse ribbing at right angles to the pipe length and to provide longitudinal ribs along the pipe joining said transverse ribs and forming pockets there between.

21. The apparatus for continuous injection molding ribbed pipe according to claim 20, wherein the female mold elements are shaped to provide said ribbing inclined to the pipe axis and crossed.

* * * * *